United States Patent
Leavy et al.

(10) Patent No.: US 10,044,688 B2
(45) Date of Patent: Aug. 7, 2018

(54) DECENTRALIZED AUTHORITATIVE MESSAGING

(71) Applicant: Wickr Inc., San Francisco, CA (US)

(72) Inventors: Thomas Michael Leavy, River Edge, NJ (US); Gerard Ryan, Maplewood, NJ (US)

(73) Assignee: Wickr Inc., San Francisco, CA (US)

(*) Notice: Subject to any disclaimer, the term of this patent is extended or adjusted under 35 U.S.C. 154(b) by 0 days.

(21) Appl. No.: 15/718,114

(22) Filed: Sep. 28, 2017

(65) Prior Publication Data

US 2018/0019981 A1 Jan. 18, 2018

Related U.S. Application Data

(63) Continuation of application No. 15/381,061, filed on Dec. 15, 2016, now Pat. No. 9,807,067, which is a continuation of application No. 15/056,968, filed on Feb. 29, 2016, now Pat. No. 9,590,956.

(60) Provisional application No. 62/269,887, filed on Dec. 18, 2015.

(51) Int. Cl.
*H04L 29/06* (2006.01)
*H04L 12/58* (2006.01)
*G06F 21/60* (2013.01)

(52) U.S. Cl.
CPC ........ *H04L 63/0428* (2013.01); *G06F 21/602* (2013.01); *H04L 51/04* (2013.01); *H04L 51/10* (2013.01); *H04L 51/24* (2013.01); *H04L 51/38* (2013.01)

(58) Field of Classification Search
CPC ..... H04L 63/0428; H04L 51/04; H04L 51/38; H04L 51/24; H04L 51/10; G06F 21/602
See application file for complete search history.

(56) References Cited

U.S. PATENT DOCUMENTS

| | | | |
|---|---|---|---|
| 6,081,893 A | 6/2000 | Grawrock et al. |
| 6,215,877 B1 | 4/2001 | Matsumoto |
| 6,263,435 B1 | 7/2001 | Dondeti et al. |
| 6,266,420 B1 | 7/2001 | Langford et al. |
| 6,463,460 B1 | 10/2002 | Simonoff |
| 6,742,116 B1 | 5/2004 | Matsui et al. |
| 6,801,998 B1 | 10/2004 | Hanna et al. |
| 6,804,257 B1 | 10/2004 | Benayoun et al. |
| 6,851,049 B1 | 2/2005 | Price |
| 6,904,521 B1 | 6/2005 | Jivsov |
| 6,912,656 B1 | 6/2005 | Perlman et al. |
| 7,024,456 B1 | 4/2006 | Simonoff |
| 7,043,529 B1 | 5/2006 | Simonoff |
| 7,149,893 B1 | 12/2006 | Leonard et al. |
| 7,178,021 B1 | 2/2007 | Hanna et al. |
| 7,240,202 B1 | 7/2007 | Orman |

(Continued)

FOREIGN PATENT DOCUMENTS

WO 2007123224 A1 11/2007

*Primary Examiner* — Darren B Schwartz
(74) *Attorney, Agent, or Firm* — Christian LaForgia

(57) ABSTRACT

A secure chat client is described that allows users to exchange encrypted communications via secure chat rooms, as well as one-to-one communications. In particular, the secure chat client allows users to create, configure, and manage secure chat rooms. Furthermore, the secure chat client provides users with the ability to recover secure messages when they obtain a new device or otherwise lose communications.

14 Claims, 14 Drawing Sheets

(56) References Cited

U.S. PATENT DOCUMENTS

| Patent/Publication | Date | Inventor(s) |
|---|---|---|
| 7,263,619 B1 | 8/2007 | Kim |
| 8,036,221 B2 | 10/2011 | Fluhrer et al. |
| 8,560,843 B1 | 10/2013 | Moscaritolo et al. |
| 8,601,263 B1 | 12/2013 | Shankar et al. |
| 8,885,830 B2 | 11/2014 | Tahan et al. |
| 8,954,740 B1 | 2/2015 | Moscaritolo et al. |
| 9,027,114 B2 | 5/2015 | Akhter et al. |
| 9,100,373 B2 | 8/2015 | Deluca et al. |
| 9,124,559 B2 | 9/2015 | Deluca et al. |
| 9,202,074 B1 | 12/2015 | Bennett et al. |
| 9,634,865 B2 * | 4/2017 | Pattan .................. H04L 12/581 |
| 2002/0037736 A1 | 3/2002 | Kawaguchi et al. |
| 2002/0095465 A1 | 7/2002 | Banks et al. |
| 2002/0166053 A1 * | 11/2002 | Wilson ................... G06F 21/62 713/189 |
| 2002/0177435 A1 * | 11/2002 | Jenkins .................. H04L 51/38 455/412.1 |
| 2003/0021416 A1 | 1/2003 | Brown et al. |
| 2003/0028597 A1 | 2/2003 | Salmi et al. |
| 2003/0046533 A1 | 3/2003 | Olkin et al. |
| 2003/0056093 A1 | 3/2003 | Huitema et al. |
| 2003/0084347 A1 | 5/2003 | Luzzatto |
| 2003/0110131 A1 | 6/2003 | Alain et al. |
| 2003/0126464 A1 | 7/2003 | McDaniel et al. |
| 2003/0131236 A1 | 7/2003 | Sasmazel |
| 2003/0163697 A1 | 8/2003 | Pabla et al. |
| 2003/0177194 A1 * | 9/2003 | Crocker ............. G06F 21/6218 709/206 |
| 2003/0204720 A1 | 10/2003 | Schoen et al. |
| 2003/0217266 A1 | 11/2003 | Epp et al. |
| 2004/0015610 A1 | 1/2004 | Treadwell |
| 2004/0044891 A1 | 3/2004 | Hanzlik et al. |
| 2004/0054802 A1 | 3/2004 | Beauchamp et al. |
| 2004/0111612 A1 | 6/2004 | Choi et al. |
| 2004/0131187 A1 | 7/2004 | Takao et al. |
| 2004/0205124 A1 | 10/2004 | Limprecht et al. |
| 2004/0215724 A1 * | 10/2004 | Smoot ................... H04L 51/22 709/206 |
| 2005/0031119 A1 | 2/2005 | Ding |
| 2005/0053232 A1 | 3/2005 | Bace |
| 2005/0075094 A1 * | 4/2005 | Kundetkar ........... G06Q 10/107 455/412.2 |
| 2005/0160292 A1 | 7/2005 | Batthish et al. |
| 2005/0198170 A1 | 9/2005 | LeMay et al. |
| 2005/0226424 A1 | 10/2005 | Takata et al. |
| 2005/0229257 A1 | 10/2005 | Kim et al. |
| 2006/0048228 A1 | 3/2006 | Takemori et al. |
| 2006/0129812 A1 | 6/2006 | Mody |
| 2006/0130135 A1 | 6/2006 | Krstulich et al. |
| 2006/0179114 A1 * | 8/2006 | Deeds ................. G06Q 10/107 709/206 |
| 2006/0190715 A1 | 8/2006 | Miller |
| 2006/0282538 A1 * | 12/2006 | Anglin ................. G06Q 10/107 709/228 |
| 2007/0003066 A1 | 1/2007 | Schwartz et al. |
| 2007/0022285 A1 | 1/2007 | Groth et al. |
| 2007/0050624 A1 | 3/2007 | Lord et al. |
| 2007/0094334 A1 * | 4/2007 | Hoffman ............. G06Q 10/107 709/206 |
| 2007/0140483 A1 | 6/2007 | Jin et al. |
| 2007/0168446 A1 | 7/2007 | Keohane et al. |
| 2007/0274525 A1 | 11/2007 | Takata et al. |
| 2007/0297610 A1 | 12/2007 | Chen et al. |
| 2008/0049941 A1 | 2/2008 | Kim et al. |
| 2008/0091780 A1 | 4/2008 | Balan et al. |
| 2008/0133761 A1 | 6/2008 | Polk |
| 2009/0074188 A1 | 3/2009 | Furukawa |
| 2009/0083183 A1 | 3/2009 | Rao et al. |
| 2009/0132822 A1 | 5/2009 | Chen |
| 2009/0158041 A1 | 6/2009 | Kang et al. |
| 2009/0178130 A1 | 7/2009 | Botz et al. |
| 2009/0190764 A1 | 7/2009 | Liu |
| 2009/0228991 A1 * | 9/2009 | Schneider ............. G06F 11/006 726/34 |
| 2009/0299200 A1 | 12/2009 | Eggenberger et al. |
| 2009/0320102 A1 * | 12/2009 | Ou .......................... H04L 51/38 726/4 |
| 2010/0100967 A1 | 4/2010 | Douglas et al. |
| 2010/0174911 A1 | 7/2010 | Isshiki |
| 2010/0185756 A1 | 7/2010 | Cheng et al. |
| 2010/0199340 A1 | 8/2010 | Jonas et al. |
| 2010/0293610 A1 | 11/2010 | Beachem et al. |
| 2010/0312836 A1 | 12/2010 | Serr et al. |
| 2011/0145571 A1 | 6/2011 | Schmidt-Karaca et al. |
| 2011/0231499 A1 * | 9/2011 | Stovicek ........... H04M 1/72547 709/206 |
| 2012/0173880 A1 | 7/2012 | Swaminathan |
| 2012/0204032 A1 * | 8/2012 | Wilkins .................. H04L 9/006 713/170 |
| 2012/0243683 A1 | 9/2012 | Oba et al. |
| 2012/0331073 A1 | 12/2012 | Williams |
| 2013/0007464 A1 | 1/2013 | Madden |
| 2013/0031367 A1 * | 1/2013 | Mao ..................... H04L 63/0407 713/168 |
| 2013/0036302 A1 | 2/2013 | Lord et al. |
| 2013/0046828 A1 | 2/2013 | Grewal et al. |
| 2013/0070045 A1 | 3/2013 | Meek |
| 2013/0097688 A1 | 4/2013 | Charles et al. |
| 2013/0124863 A1 | 5/2013 | Drucker |
| 2013/0173905 A1 | 7/2013 | Inatomi et al. |
| 2013/0182848 A1 | 7/2013 | Sundaram et al. |
| 2013/0198518 A1 | 8/2013 | Ran et al. |
| 2013/0219035 A1 | 8/2013 | Detienne et al. |
| 2013/0227030 A1 * | 8/2013 | Eidelson ............. H04L 67/1095 709/206 |
| 2013/0326220 A1 | 12/2013 | Connelly et al. |
| 2013/0332724 A1 | 12/2013 | Walters |
| 2013/0339465 A1 | 12/2013 | Zhang et al. |
| 2014/0038650 A1 * | 2/2014 | Wang ...................... H04W 4/14 455/466 |
| 2014/0047237 A1 | 2/2014 | Parrish |
| 2014/0089684 A1 | 3/2014 | Guo et al. |
| 2014/0115329 A1 | 4/2014 | Sturonas et al. |
| 2014/0129838 A1 | 5/2014 | Kim et al. |
| 2014/0208229 A1 | 7/2014 | Nalliah et al. |
| 2014/0245178 A1 * | 8/2014 | Smith ..................... H04L 51/16 715/753 |
| 2014/0281555 A1 | 9/2014 | Dixon |
| 2014/0310514 A1 | 10/2014 | Favero |
| 2014/0351586 A1 | 11/2014 | Hook et al. |
| 2015/0120653 A1 * | 4/2015 | Luo ......................... H04L 51/16 707/610 |
| 2015/0143546 A1 | 5/2015 | Charles et al. |
| 2015/0195261 A1 | 7/2015 | Gehrmann et al. |
| 2015/0281185 A1 | 10/2015 | Cooley |
| 2015/0304849 A1 | 10/2015 | Moon et al. |
| 2015/0312260 A1 | 10/2015 | Kim et al. |
| 2015/0350895 A1 | 12/2015 | Brander et al. |
| 2016/0021038 A1 | 1/2016 | Woo et al. |
| 2016/0028660 A1 | 1/2016 | Weishaupl et al. |
| 2016/0072781 A1 | 3/2016 | Zhang et al. |
| 2016/0241530 A1 | 8/2016 | Andreev et al. |
| 2016/0261685 A1 | 9/2016 | Chen et al. |
| 2016/0337124 A1 * | 11/2016 | Rozman .................. H04L 9/085 |
| 2016/0344711 A1 | 11/2016 | Rokui et al. |
| 2016/0352677 A1 | 12/2016 | Gordon |
| 2016/0380931 A1 | 12/2016 | Sircar et al. |
| 2017/0052676 A1 * | 2/2017 | Pulier .................. G06F 3/04817 |
| 2017/0288887 A1 * | 10/2017 | Wang ...................... H04L 51/14 |

\* cited by examiner

DECENTRALIZED AUTHORITATIVE MESSAGING

CROSS REFERENCE TO OTHER APPLICATIONS

This application is a continuation of co-pending U.S. patent application Ser. No. 15/381,061, entitled "Decentralized Authoritative Messaging," filed on Dec. 15, 2016, which is a continuation of U.S. patent application Ser. No. 15/056,968, entitled "Decentralized Authoritative Messaging," filed on Feb. 29, 2016 and issued as U.S. Pat. No. 9,590,956 on Mar. 7, 2017, which claims priority to U.S. Provisional Patent Application No. 62/269,887, entitled "Decentralized Authoritative Messaging," filed Dec. 18, 2015, all of which are incorporated herein by reference in their entireties.

This application is also related to U.S. application Ser. No. 15/056,938, entitled "Decentralized Authoritative Messaging," filed on Feb. 29, 2016 and issued as U.S. Pat. No. 9,584,493 on Feb. 28, 2017, U.S. patent application Ser. No. 15/247,815, entitled "Decentralized Authoritative Messaging," filed on Aug. 25, 2016 and issued as U.S. Pat. No. 9,673,973 on Jun. 6, 2017, U.S. patent application Ser. No. 15/587,553, entitled "Decentralized Authoritative Messaging," filed on May 5, 2017, and U.S. patent application Ser. No. 15/633,047, entitled "Decentralized Authoritative Messaging," filed on Jun. 26, 2017, all of which are incorporated herein by reference in their entireties.

BACKGROUND OF THE INVENTION

Companies today are faced with the challenge of providing communication tools to support an increasingly mobile workforce. Enterprises who value the privacy and secrecy of their sensitive communications should consider who sits in the middle of their electronic communications. Between foreign governments and infrastructure providers, the opportunity to capture unprotected text messages, chat rooms, phone calls, and emails deliberately is real. Thus, there is a need for a secure communications tool that allows enterprises to collaborate via secure chat rooms and one-to-one communications to accommodate a mobile workforce.

BRIEF DESCRIPTION OF THE DRAWINGS

Various embodiments of the invention are disclosed in the following detailed description and the accompanying drawings.

DETAILED DESCRIPTION

Figure 1:
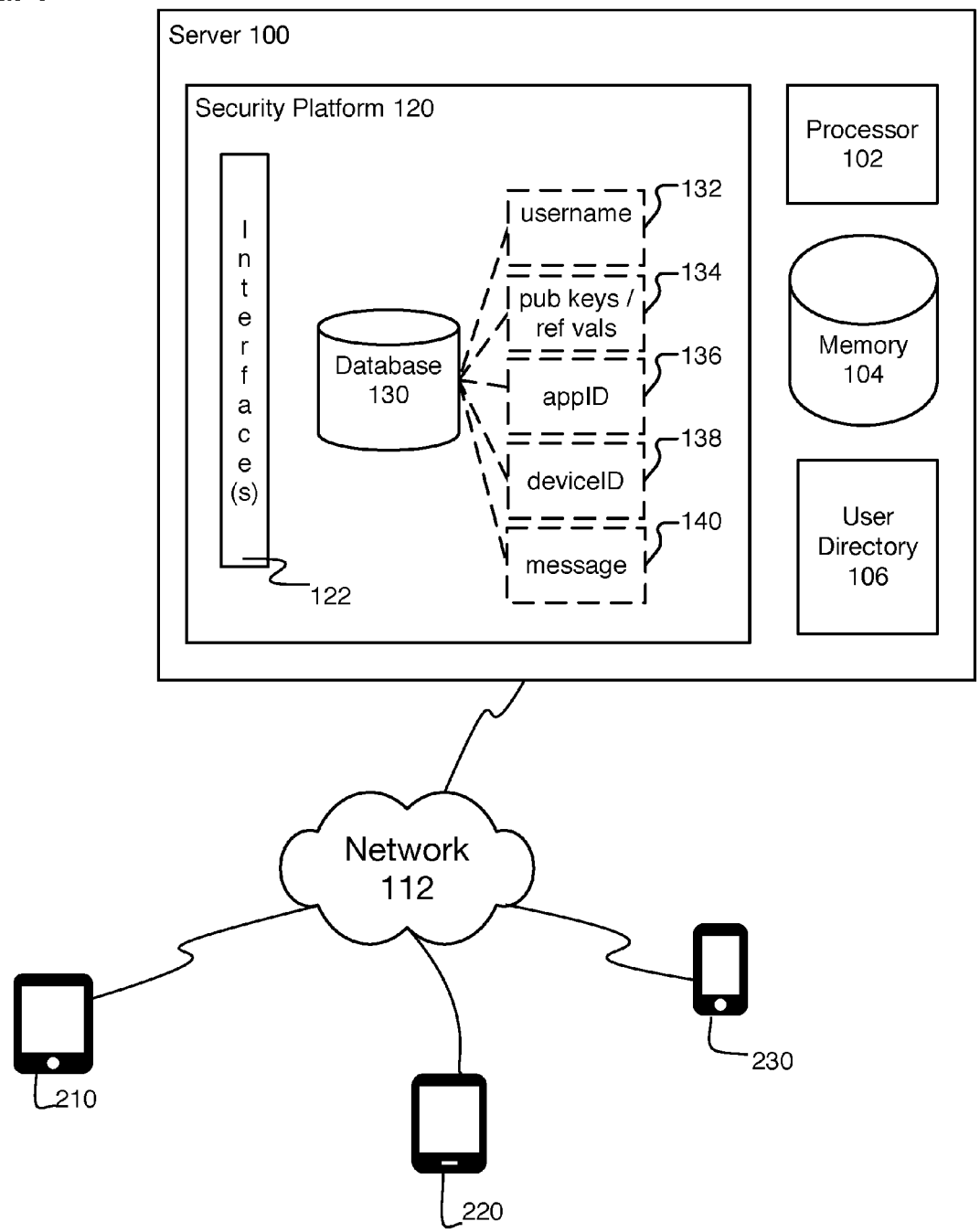
FIG. 1 illustrates a system for providing secure communications according to one embodiment of the disclosure.

The present disclosure describes a system and method for creating and managing secure chat rooms. Secure chat rooms allow groups of users, such as team members or departments, to collaborate on projects and share information. In some aspects, sharing information may include confidential or proprietary information. The present disclosure describes a secure messaging app that provides users the ability to exchange encrypted communications via secure chat rooms, as well as one-to-one communications.

In order to create a secure chat room, a user accesses the secure messaging app and elects to create a new room. The user creating the room is a room administrator by default. However, the user may designate one or more room administrators. Additionally, the user may configure one or more parameters for the secure chat room, including a title of the room, a description of the room, and a Time-to-Live parameter for messages. Next, the user may add participants to the secure chat room. Once the user has set the parameters for the secure chat room, the user's secure messaging app may generate a group identifier for the secure chat room. The parameters and group identifier may be bundled and transmitted to the secure room's participants via an encrypted message that instructs the receivers' secure messaging apps to create a secure room. The room creator will store the information for the secure chat room in an encrypted format in a local database on the user's device.

In response to receiving the encrypted message, the participants' secure messaging app may decrypt the message and begin creating and configuring the secure chat room in accordance with the information provided by the room creator. In particular, the participants' secure message app may use the one or more parameters set by the room creator to set the room title, the room description, the Time-to-Live for messages, and display the list of participants. After creating the secure chat room, the receivers' secure messaging app may store the secure room information and transaction information for the secure chat room in the receivers' local databases. The secure room information and transaction information may be stored in a block chain format, such that each participant of the secure chat room documents all commands and communications. In this regard, the secure chat room is managed in a distributed manner by all the participants of the room, and not centrally on a server.

Once the secure chat room is created, participants may exchange encrypted communications for the chat room. Further, room administrators may update one or more parameters of the secure chat room after the room is created. However, the updates to one or more secure chat room parameters may cause a participants' secure messaging app to not recognize a received communication. For example, a secure messaging app may not recognize a sender of a communication after the participant list has been changed. Alternatively, a secure messaging app may not recognize an updated group identifier of a received communication.

To handle these situations, and others like them, the participant's secure messaging app transmits a request to the sender of the unrecognized message to obtain additional information. The request may include a group identifier and a message identifier for the sender's reference.

In response to the request, the sender may use the group identifier and message identifier to provide the sender with additional information. The additional information may include details for the participant to retrieve and decrypt the encrypted message. For example, the details may include metadata, the message identifier, and the message encryption key. In this regard, the participant may obtain the encrypted message from a security platform using the metadata and message identifier and decrypt the message using the message encryption key. Accordingly, the participant may subsequently update the secure chat room information, including transaction information, in response to successfully decrypting the message.

If a participant is missing communications or fails to recognize a message, the participant may send a recover lost communications request to another participant to obtain secure chat room communications over a certain period of time. For example, the participant may send the recover lost communications message to the last sender to provide a communication to the secure chat room. In response to the recover lost communications message, the sender may determine which communications the requester was a participant for. Accordingly, the sender may generate a communication information array providing details for the requester to retrieve the messages from the security platform. In some embodiments, the recover lost communications message may come from an administrator and the sender will provide the requester with the secure chat room's entire history.

While the examples described herein are described with respect to restoring a user's account to a new device, the systems and processes may be applicable to other techniques.

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided below along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

FIG. 1 illustrates an embodiment of an environment in which secure communications are exchanged. In particular, FIG. 1 illustrates a first client device 210, second client device 220, and third client device 230 connected to security platform 120, located on server 100, via network 112.

Typically, secure communications are exchanged using secure message datagrams, which encapsulate a sender's message. The datagram also allows information such as encryption information, hardware binding information, message security controls, and decryption information—for multiple receivers (as applicable)—to securely travel with the message. The secure message datagram also provides cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the messages. Thus, for example, the security platform 120 is unable to decrypt messages. As will further be described in more detail below, using the techniques described herein, message participants can maintain a forward secret secure messaging channel, whether communicating synchronously (e.g., where all participants are online or otherwise able to communicate with platform 120) or asynchronously (e.g., where at least one participant is offline or otherwise not in communication with platform 120).

As shown in FIG. 1, security platform 120 may be implemented on server 100. Server 100 may include a processor 102, memory 104, user directory 106, and the security platform 120. In this regard, server 100 may be a stand-alone server, a corporate server, or a server located in a server farm or cloud-computing environment. In some embodiments, the server 100 may be a cloud service provider running a virtual machine configured to provide security platform 120 to an enterprise as a Software as a Service (SaaS).

Processor 102 may be any conventional processor capable of interacting with memory 104, user directory 106, and security platform 120. In this regard, processor 102 may include a processor, multiprocessors, a multicore processor, or any combination thereof. Alternatively, processor 102 may be a dedicated controller, such as an Application Specific Integrated Circuit (ASIC) or Field Programmable Gate Array (FPGA).

Memory 104 stores information accessible by processor 102, including instructions and data that may be executed or otherwise used by the processor 102. Memory 104 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 104 may include short term or temporary storage as well as long term or persistent storage. According to some embodiments, memory 104 may include a storage area network (SAN) accessible by the security platform 120.

User directory 106 may be any database or table capable of providing directory services. For example, user directory may include a corporate directory that include employees' first and last names, usernames, email address, phone numbers, department information, etc. Alternatively, user directory 106 may be a database or table to maintain user information for users of security platform 120. In this regard, user directory 106 may be encrypted. In some embodiments, user directory 106 may serve as a secure directory that includes a table of hashed usernames, a table of appIDs, and a table of deviceIDs for a secure messaging app. Accordingly, user directory 106 may be used to share information about users, systems, networks, services and applications. According to some embodiments, the user directory 106 may include a Lightweight Directory Access Protocol (LDAP).

Although FIG. 1 illustrates processor 102, memory 104, user directory 106, and security platform 120 as being located on server 100, processor 102 and memory 104 may comprise multiple processors and memories that may or may not be stored within the same physical housing. For example, memory 104 may be a hard drive or other storage media located in a server farm of a data center. Accordingly, references to a processor, a computer, or a memory will be understood to include references to a collection of processors or computers or memories that may or may not operate in parallel. Further, the user directory 106 may be located in a separate physical housing from processing engine 102 and memory 104. Moreover, security platform 120 may be distributed across multiple servers.

Security platform 120 may be configured to facilitate the exchange of communications for users of a secure messaging app. As used herein, "communications" and "messages" may take a variety of forms, including: text messages, chat room messages, control messages, commands, e-mails, documents, audiovisual files, Short Message Service messages (SMSes), voice calls (i.e., VOIP), and video calls. Additionally, the content of the messages and/or communications may pertain to electronic transactions, such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Security platform 120 may provide encrypted communications that easily integrate into and secure existing systems while providing compliant and secure communications. In this regard, security platform 120 may integrate with existing identity systems, such as user directory 106. Further, security platform 120 may include built-in support for enterprise data retention and support systems.

Security platform 120 may also include database 130. Database 130 may be a relational database that stores information in a variety of tables. In this regard, database 130 may include a record for each user of platform 120 to allow users to find other users and communicate with other users. Accordingly, database 130 may include a table of hashed usernames 132, a table of public keys and reference values 134, a table of appIDs 136, and a table of deviceIDs 138. Each user record may include a hashed username in table 132, a pool of ECDH public components and associated reference values in table 134, app ID(s) in table 136, and deviceID(s) in table 138. Additionally, each user record may store privacy mode and privacy list entries to control with whom the user may communicate. Additionally, database 130 may include a table of messages 140. That is, the security platform may store messages for a predetermined time in table 140. For example, when a message is received, the security platform may store the message in the table of messages and provide an alert, such as a push notification, to the receiver. Accordingly, a receiver may access the security platform to obtain his or her messages stored in table 140. In preferred embodiments, table 140 may store messages for 30 days; however, this may be adjusted, as needed, based on industry standards and/or to comply with regulatory schemes.

While a database is shown in FIG. 1, other techniques can be used to store the information used by platform 120 to facilitate exchange of messages. For example, the table of messages may be stored in a separate storage, such as memory 104, instead of being stored within database 130. Alternatively, the information contained in the database may be divided between database 130 and user directory 106. In this regard, database 130 and user directory 106 may interface to exchange information. Further, additional information can be securely stored on platform 120, whether in database 130 or another appropriate location, such as user verification information and user verification settings.

Security platform 120 may include one or more interface(s) 122 for communicating with client devices 210, 220, and 230. As one example, platform 120 may provide an application programming interface (API) configured to communicate with apps installed on client devices. Platform 120 may also provide other types of interfaces, such as a web interface, or stand alone software programs for desktops and laptops, running on various Operating Systems (OSes). The web interface may allow users of client devices to exchange messages securely (whether with one another or other users), without the need for a separately installed messaging application. The standalone software program may allow users to exchange secure messages via software that is downloaded by each user. According to some embodiments, platform 120 may make available a master clock time available via the one or more interface(s) 122. The master clock time may be used by client apps to enforce secure time-to-live (TTL) values of messages. The TTL values can be used to enforce (e.g., on behalf of a message sender) time constraints on message access (e.g., by a receiver).

Users of client devices, such as client devices 210, 220, 230, may communicate securely with one another using the techniques described herein. For example, client devices 210, 220, 230 may make use of the security platform 120 and the techniques described herein via a secure messaging app (not shown). As shown in FIG. 1, client devices may be mobile devices, such as a laptop, smart phone, or tablet, or computing devices, such as desktop computers or servers. As noted above, the secure messaging app described herein allows cross-platform communications, thereby allowing users of various devices to communicate seamlessly. Further, each user may have different instances of the messaging app across multiple devices. That is, the user of device 210 may be able to receive messages on both device 210 as well as on any other devices that the user may have that includes a copy of the secure messaging app, such as a laptop. In some embodiments, client devices 210, 220, 230 may be the users' personal devices (i.e. a bring your own device (BYOD) scenario). Alternatively, client devices may include other types of devices, such as game consoles, camera/video recorders, video players (e.g., incorporating DVD, Blu-ray, Red Laser, Optical, and/or streaming technologies), smart TVs, and other network-connected appliances, as applicable.

Communications between users of client devices 210, 220, 230 may be exchanged via network 112. Network 112 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

As will be described in more detail below, processor 102 may perform a plurality of tasks on behalf of security platform 120. Furthermore, whenever platform 120 is described as performing a task, either a single component or a subset of components or all components of platform 120 or enterprise server 100 may cooperate to perform the task. For example, platform 120 may designate one of the keys in a pool of ECDH public components received from a user of a device as a "reserve" key. Another task performed by platform 120 may include facilitating the addition of new keys to a user's pool of public components as they are used. Yet another task performed by platform 120 may include dynamically adjusting the size of a user's pool of public components as needed.

Figure 2:
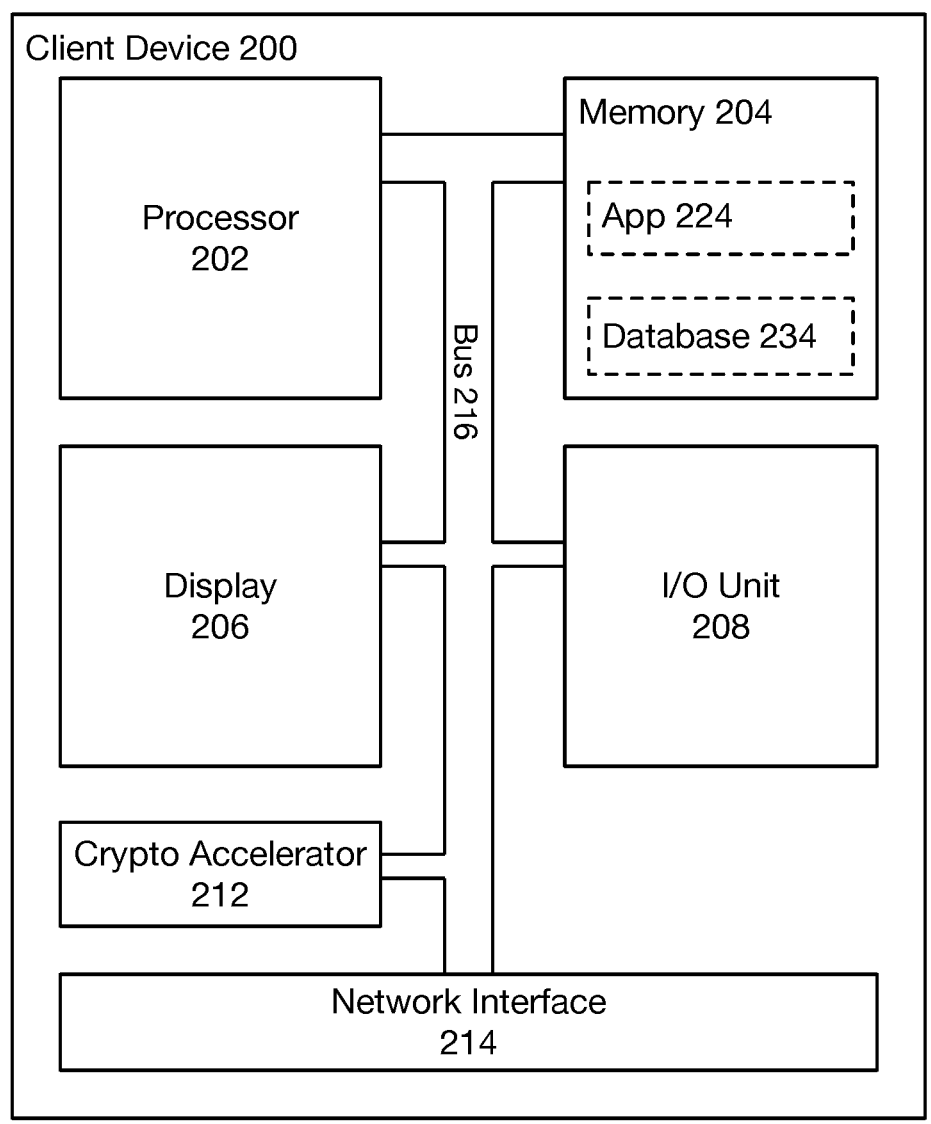
FIG. 2 illustrates a client device that transmits and receives encrypted communications using a secure messaging app.

FIG. 2 illustrates an exemplary client device 200 that may access the security platform 120 via a secure messaging app. In this regard, client device 200 includes a processor 202, a memory 204, a display 206, an I/O unit 208, a cryptographic ("crypto") accelerator 212, and a network interface 214 all interconnected by bus 216.

Processor 202 may be any conventional processor capable of interacting with the components of client device 200. For example, processor 202 may include a processor, multiprocessors, multicore processor, a dedicated controller, such as an ASIC or an FPGA, or any combination thereof. Memory 204 may store information accessible by processor 202, including instructions and data that may be executed or otherwise used by the processor 202 and/or crypto accelerator 212. For example, memory 204 may store instructions, such as app 224. In preferred embodiments, app 224 may be a secure messaging app that provides users with the ability to transmit and receive encrypted communications. Encrypted communications may include direct communications (e.g., one-to-one communications between a sender and receiver), group chats, or secure chat room communications. Data stored by memory 204 may include database 234. Database 234 may be encrypted via an encryption algorithm, such as Advanced Encryption Standard (AES), and a 256-bit key, referred to hereinafter as a local storage key. In some embodiments, database 234 may be used to store information related to secure messaging app 224. For example, database 234 may index communications transmitted and received by the secure messaging app, including a message identifier, a hash of the sender's username, a hash of the sender's appID, a hash of the receiver's username, a hash of the receiver's appID, the message encryption key, and a timestamp of the message. According to another example, database 234 may store information related to secure chat rooms. In this regard, the database may create a block chain of transactions for the secure chat room. Each transaction in the block chain may include the message identifier, a group identifier, the hash of the sender's username, the hash of the sender's appID, the hash of the receiver's username, the hash of the receiver's appID, a message type, the message encryption key, and the timestamp of the message. The message type may specify whether the message is a control message or a standard communication. Control messages are either authoritative control messages or non-authoritative control messages. Authoritative control messages originate from room administrators and modify a state of the secure chat room. For example, authoritative control messages may include commands, such as creating the secure chat room, modifying the secure chat room (e.g., changing the TTL), or deleting the secure chat room. Secure chat room participants other than the room administrator may send non-authoritative control messages. For instance, when a participant opts to leave a secure chat room, his or her secure messaging app will send a non-authoritative control message indicating that the user has left the secure chat room. Control messages may be stored by participants of the secure chat room, regardless of the TTL set for the secure chat room. That is, control messages may not be deleted by secure chat room participants' secure message apps according to the TTL set for the secure chat room. As will be discussed in greater detail below, these control messages may be used by participants should any confusion arise regarding the state of the secure chat room. Alternatively, all control messages for a secure chat room may be maintained in a block chain until the next authoritative control message is received. After receiving an authoritative control message, participants' apps may purge all previous control messages, including earlier authoritative and non-authoritative control messages. Standard communications may include content for the secure chat room including, for example, text, images, video, audio, and other multimedia content. Standard communications are maintained in the block chain according to the TTL set for the secure chat room. For example, if the secure chat room has a TTL of 24 hours, standard communications may be deleted from the block chain 24 hours after the transaction has been created. Additionally, each transaction in the block chain may be signed using a secret shared amongst the room participants. In this way, a record of the secure chat room is maintained by each participant, and not centrally on the security platform or another server. Accordingly, memory 204 may be any type of media capable of storing the information above, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 104 may include short term or temporary storage as well as long term or persistent storage.

Display 206 may be any electronic device capable of visually presenting information. In mobile devices, such as smart phones and tablets, display 206 may be a touchscreen display. In this regard, display 206 may be integrated with I/O unit 208 to detect user inputs, as well as output data. In computing devices, display 206 may be an output, such as a VGA, DVI, or HDMI output, configured to connect to a monitor. I/O unit 208 may be capable of receiving input from a user. As noted above, the I/O unit 208 may work with touchscreen displays to receive input from a user. Alternatively, the I/O unit may be an interface capable of interacting with input and output devices, such as keyboards, mice, monitors, printers, etc.

Crypto accelerator 212 may be dedicated hardware, software, or a combination thereof that is capable of performing cryptographic operations, such as key generation, random number generation, encryption/decryption, signature generation, signature verification, etc. In preferred embodiments, crypto accelerator 212 is a dedicated processor configured to perform cryptographic operations on behalf of processor 202. In this regard, app 224 may make use of crypto accelerator 212 to provide the secure communication functions described in greater detail below.

Network interface 214 may be dedicated hardware, software, or a combination thereof that is capable of connecting client device 200 to network 112. In this regard, network interface 214 may include various configurations and use various communication protocols including Ethernet, TCP/IP, ATM, cellular and wireless communication protocols (e.g. 802.11, LTE), instant messaging, HTTP and SMTP, and various combinations of the foregoing.

Figure 3:
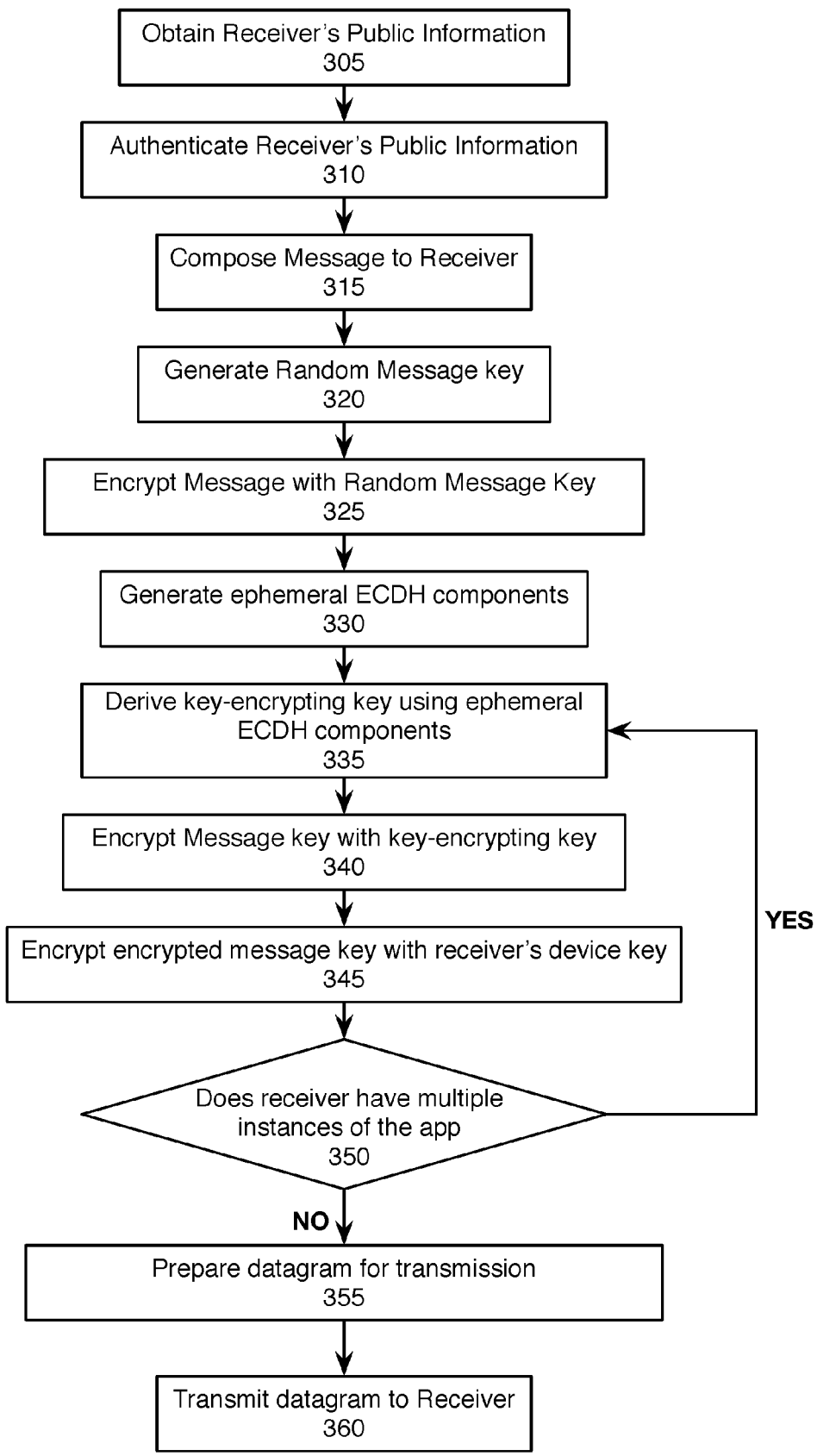
FIG. 3 illustrates a process for transmitting encrypted datagrams.

In order to send and receive secure communications, both the sender and receiver need to have a copy of the app running on their respective devices. In this regard, FIG. 3 illustrates an exemplary process for transmitting encrypted communications using the app 224. The method begins in bock 305, with the sender's app obtaining the intended receiver's public information. Obtaining the intended receiver's public information may include transmitting a request to the security platform, or another secure directory, for the intended receiver's public information. In response to receiving the request, the security platform or secure directory responds with the intended receiver's public information. In this regard, the public information may include at least one of the receiver's app ID, user-level signing public key, signed app-level signing public key, a signed ephemeral ECDH public component, an identifier of the ephemeral ECDH public component, and the receiver's device key. In preferred embodiments, the security platform may randomly select one of the signed ephemeral ECDH public components from a pool of public components that the receiver has previously uploaded to security platform 120. Further, the security platform will delete the selected ephemeral ECDH public component so it is not used for any subsequent communications. If the receiver has multiple instances of the app installed on different devices, the sender's app will receive a unique signed app-level signing public key, signed ephemeral ECDH public component, identifier of the ephemeral ECDH public component, and device key for each instance of app in block 305. The multiple instance information may be provided in an arrayed response by the security platform.

In block 310, the sender's app authenticates the public information received from the security platform. In this regard, the user-level signing public key received from security platform is used to verify a signature attached to the app-level signing public key. If the receiver has multiple instances of the app, the sender's app will authenticate the app-level public key for each of the receiver's apps. When the signature attached to the app-level public key is successfully validated, the sender's app uses the app-level signing public key to validate the signatures appended to the received ephemeral ECDH public component.

After authenticating the receiver's public information, the sender begins composing their message to the receiver in block 315. While the sender is preparing the message, the sender's app generates a random, 256-bit message key in block 320. According to some embodiments, the sender's app may use the crypto accelerator described above to generate the message key. In preferred embodiments, the message key is a symmetric key generated by applying multiple rounds of a hash function to a set of pseudorandom bytes derived from the sender's device. The pseudorandom bytes may be obtained from appropriate sources, such as ephemeral environmental noise obtained from device drivers and other kernel operations. Once the message is composed and the message key generated, the sender's app will encrypt the message in block 325. The secure messaging app may encrypt the message, via the crypto accelerator, using a symmetric encryption algorithm. In some embodiments, the secure messaging app encrypts the message using the Advanced Encryption Standard (AES).

In block 330, the sender's app generates a pair of ephemeral ECDH components. The pair of ephemeral ECDH components is generated using ECC. In block 335, the sender's app derives a key-encrypting key using the receiver's ephemeral ECDH public component and the ephemeral ECDH private component generated by the sender's app. In preferred embodiments, the key-encrypting key is a 256-bit key derived using ECDH.

In block 340, the message key is encrypted using the key-encrypting key. In preferred embodiments, the message key is encrypted by the crypto accelerator using AES and the key-encrypting key. Next, in block 345, the sender's app encrypts the encrypted message key again using the receiver's device key obtained with the receiver's public information. Preferably, the encrypted message key is encrypted by the crypto accelerator using AES and the receiver's device key. Encrypting the message key with an ephemeral component generated by the receiver's app and the device key provides a twice-encrypted message key that effectively binds the message to the receiver's secure messaging app and device.

In block 350, the sender's app determines whether the receiver has multiple instances of the app installed on a plurality of devices. If so, the sender's app repeats blocks 335, 340, and 345 for each instance of the receiver's app. In this regard, each instance will receive a twice-encrypted message key that is unique to that instantiation of the secure messaging app. Accordingly, each instance will only be able to decrypt the twice-encrypted message key that has been encrypted with the app's unique device key and ephemeral public component.

When twice-encrypted message keys have been generated for each of the receiver's instantiations of the app, the sender's app begins preparing a datagram in block 355. The datagram includes a payload and a header. The payload comprises the encrypted message, while the header includes destination entries for each of receiver's apps. That is, the sender's app addresses the message in a one-to-many manner. For instance, the sender addresses the message to the receiver, but the sender's app composes a datagram that is addressed to each of the receiver's apps. Accordingly, each destination entry includes the twice-encrypted message key specific to that app; the ephemeral ECDH key identifier unique to the receiver's app; and the sender's signed ephemeral public component.

Once the datagram is assembled, the sender's app will transmit the datagram to the receiver in block 360. In preferred embodiments, the sender's app may transmit the datagram to the security platform. Accordingly, the security platform will notify receivers that they have new messages waiting for them. Alternatively, the sender and receiver may communicate in a peer-to-peer setting. According to these embodiments, the sender's app may transmit the datagram directly to the receiver in block 360.

Figure 4:
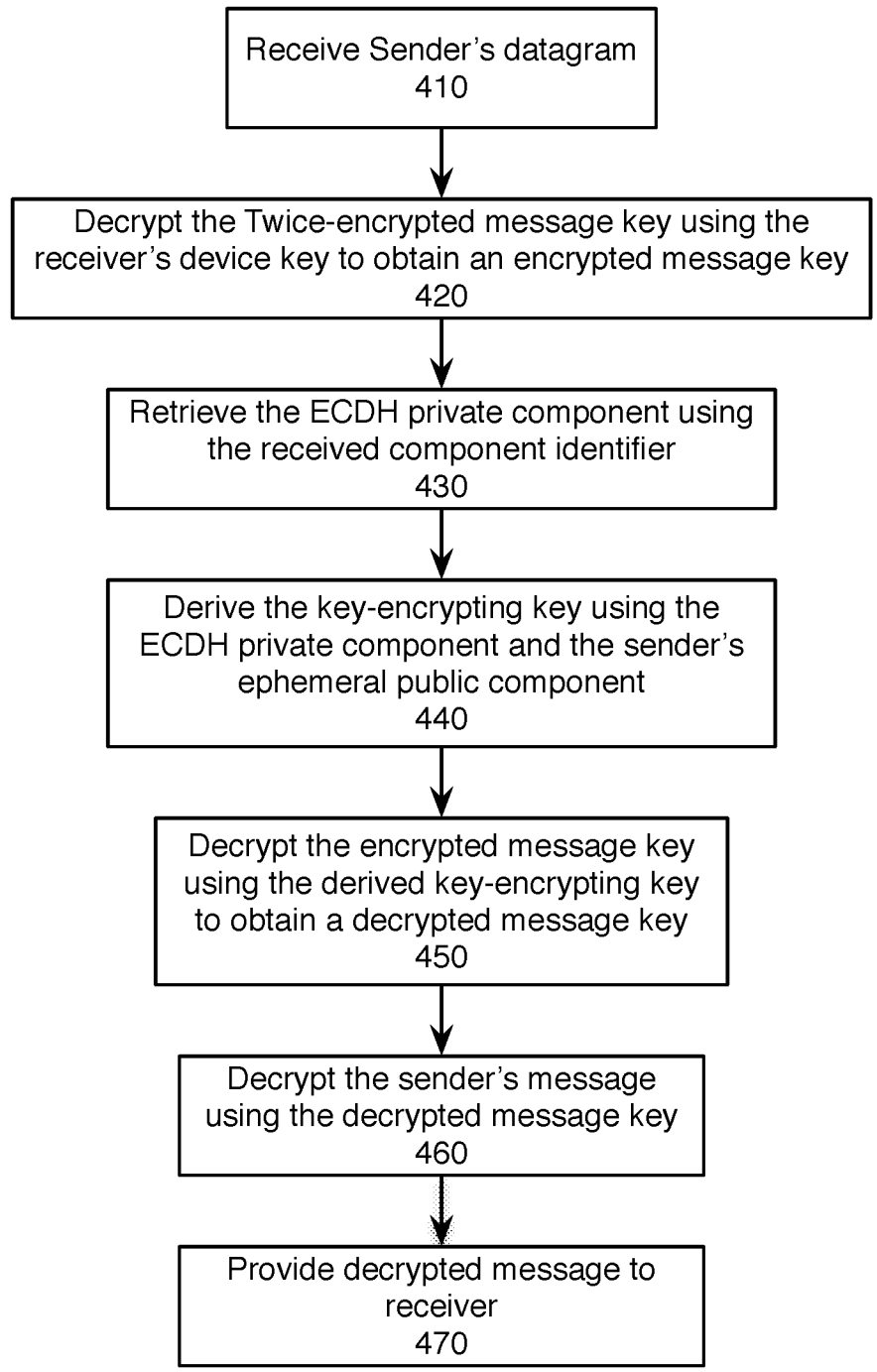
FIG. 4 illustrates a process for receiving and decrypting a datagram received from a sender.

FIG. 4 illustrates an exemplary process for receiving and decrypting a datagram received from a sender. In block 410, the receiver receives the sender's datagram. As noted above, retrieving the sender's datagram may be in response to receiving an alert, such as a push notification, from the security platform. The receiver's secure messaging app may connect to the security platform and download the sender's datagram. Alternatively, the receiver's secure messaging app may receive the sender's datagram directly from the sender via a peer-to-peer communication.

In block 420, the receiver's secure messaging app decrypts the twice-encrypted message key using the device key associated with the receiver's device. Next, the receiver's secure messaging app uses the ECDH component identifier to retrieve the ephemeral ECDH private component that corresponds to the public component used to generate the key-encrypting key in block 430. Next, in block 440, the receiver's secure messaging app derives the key-encrypting key using the retrieved ephemeral private component and the sender's ephemeral public component that was received in the datagram. After deriving the key-encrypting key, the receiver's secure messaging app decrypts the encrypted message key in block 450 to obtain a decrypted message key. In block 460, the decrypted message key is used to decrypt the message contained in the sender's datagram. In preferred embodiments, the message is decrypted via a symmetric encryption/decryption scheme, such as AES. Finally, the decrypted message is provided to the receiver in block 470. The decrypted message may be encrypted locally on the receiver's device using a local storage key. In this regard, the secure messaging app encrypts messages at rest on the receiver's device. The local storage key may be a 256-bit key that is used to encrypt data on the receiver's device using a symmetric encryption algorithm, such as AES. Thus, the secure messaging app secures data, both in-transit and at-rest.

Figure 5:
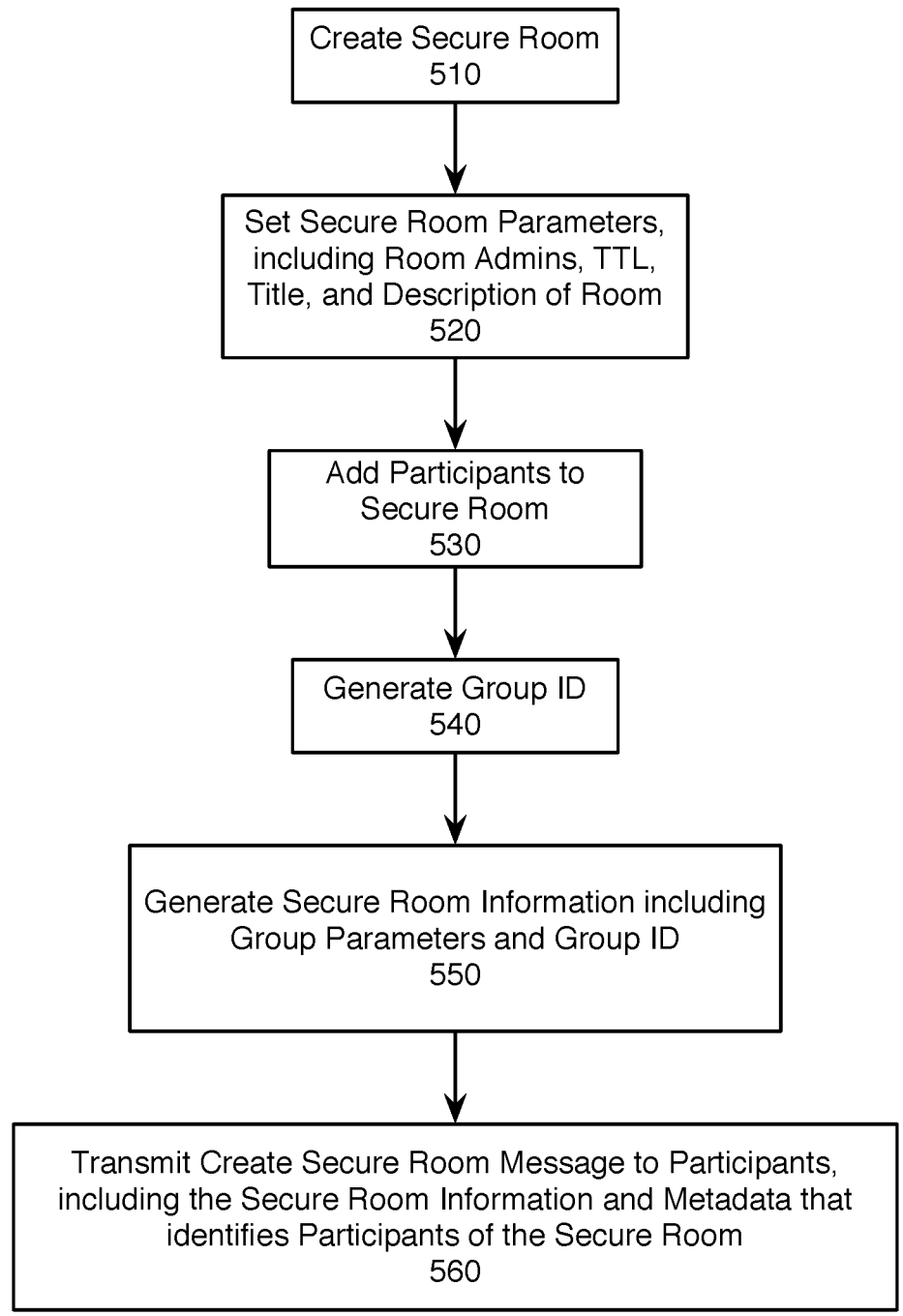
FIG. 5 shows a process for creating a secure chat room.

In addition to providing secure communications, the app 224 may provide secure chat rooms that allow groups of people to communicate securely. FIG. 5 shows an exemplary process for creating a secure chat room.

The process begins in block 510, when a user, referred to hereinafter as a "room administrator" or "room admin," creates a secure room. Creating a secure room may be similar to creating a secure message to a receiver. That is, the room administrator may select a "New Secure Room" icon. Alternatively, the room administrator may be able to create a new secure room from a drop down menu. In other alternatives, the app may prompt the user as to whether he or she would like to create a secure room when creating a new message.

Once the secure room is created, the room administrator may set the secure room's preferences in block 520. Setting the secure room's preferences may include assigning room administrator privileges to other participants of the secure chat room. Additionally, or alternatively, setting the room preferences may include assigning the secure chat room a title, adding a description of the room, and/or setting a Time-to-Live (TTL) for messages submitted to the chat room. The TTL for messages may specify how long participants can view messages in the group chat. According to preferred embodiments, the TTL may be specified by the room administrator and apply to all chats submitted to the secure chat room. Alternatively, the TTL may be set by the sender of a communication. In some embodiments, the TTL may be set for the secure chat room, but senders may have the option to change the TTL for individual communications.

After setting the room preferences, the room administrator may add participants to the secure room in block 530. Adding participants to the secure room may include selecting usernames from a directory. For example, if the app is used by an enterprise, participants may be added to a group chat from the enterprise's corporate directory. Alternatively, the participants may be added based on an external unique identifier, such as a telephone number or an email address. If the external users do not have a copy of the app, they may be prompted to obtain a copy from a third party.

In block 540, the room administrator's app generates a group identifier for the secure chat room. In preferred embodiments, the group identifier may be a hash of the room title and description. Alternatively, the group identifier may be a random identifier generated by a pseudorandom number generator. In this regard, the group identifier may be any unique identifier used by the secure messaging apps to identify which chat room received communications belong to. Next, the sender's app generates secure room information in block 550. The secure room information may include the room preferences set by the room administrator and the group identifier generated by the sender's app.

In block 560, a ""Create Secure Room"" control message is transmitted to participants of the secure chat room. In this regard, the "Create Secure Room" message may include a command instructing the participants' apps to create a secure room. Further, the "Create Secure Room" message may include the secure room information and metadata that identifies the participants of the secure chat room. In preferred embodiments, hashed usernames of the secure chat room's participants are included in the metadata. The "Create Secure Room" command, the secure room information, and the metadata are transmitted to room participants in the payload of the secure datagram described above. That is, the "Create Secure Room" command, the secure room information, and the metadata may be encrypted with a random message key, which is encrypted using information unique to each room participant. Accordingly, participants of the secure chat room may be able to decrypt the random "Create Secure Room" message using the techniques described above.

Figure 6A:
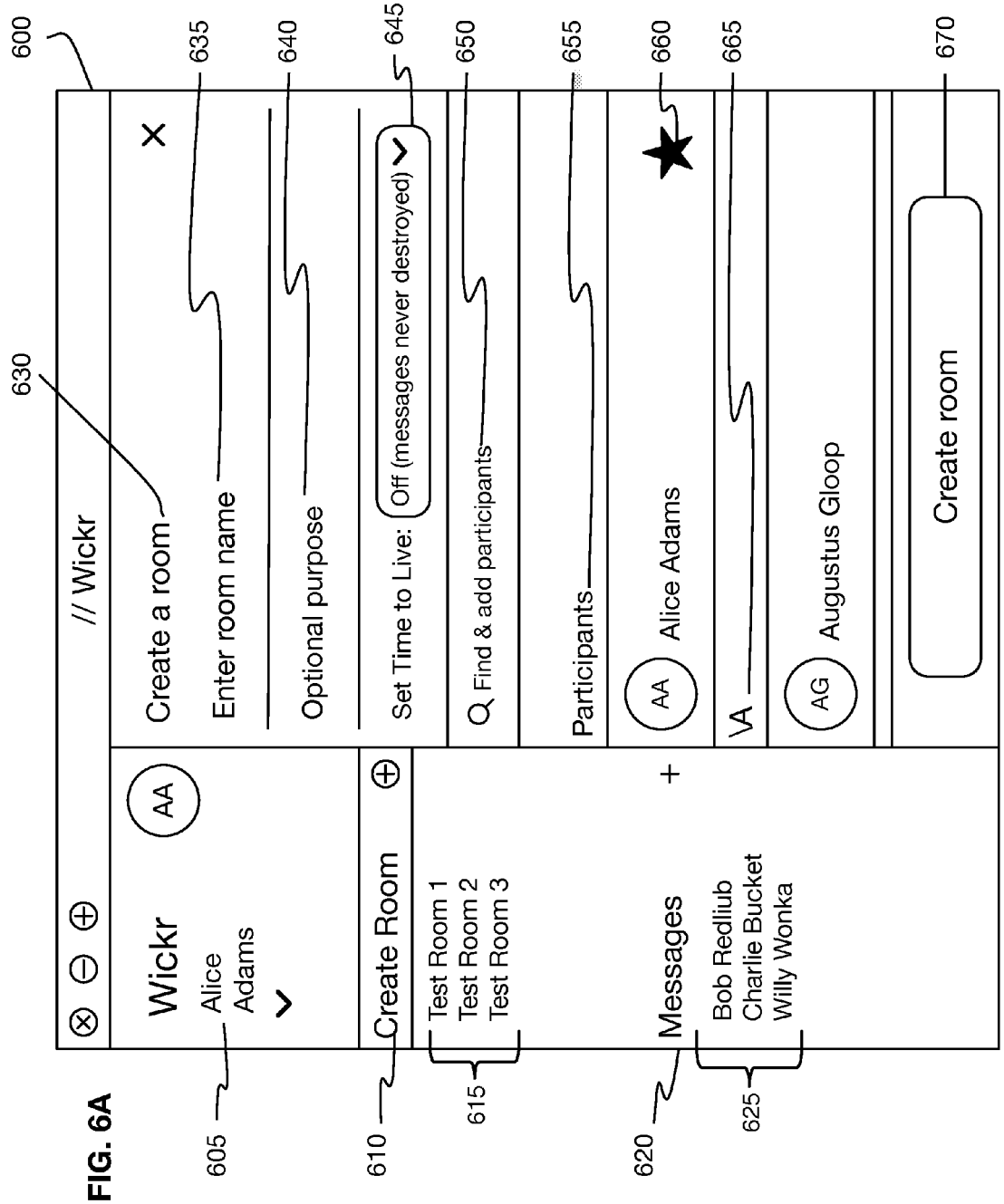
FIGS. 6A and 6B illustrate an interface for creating a secure room according to one embodiment of the disclosure.
Figure 6B:
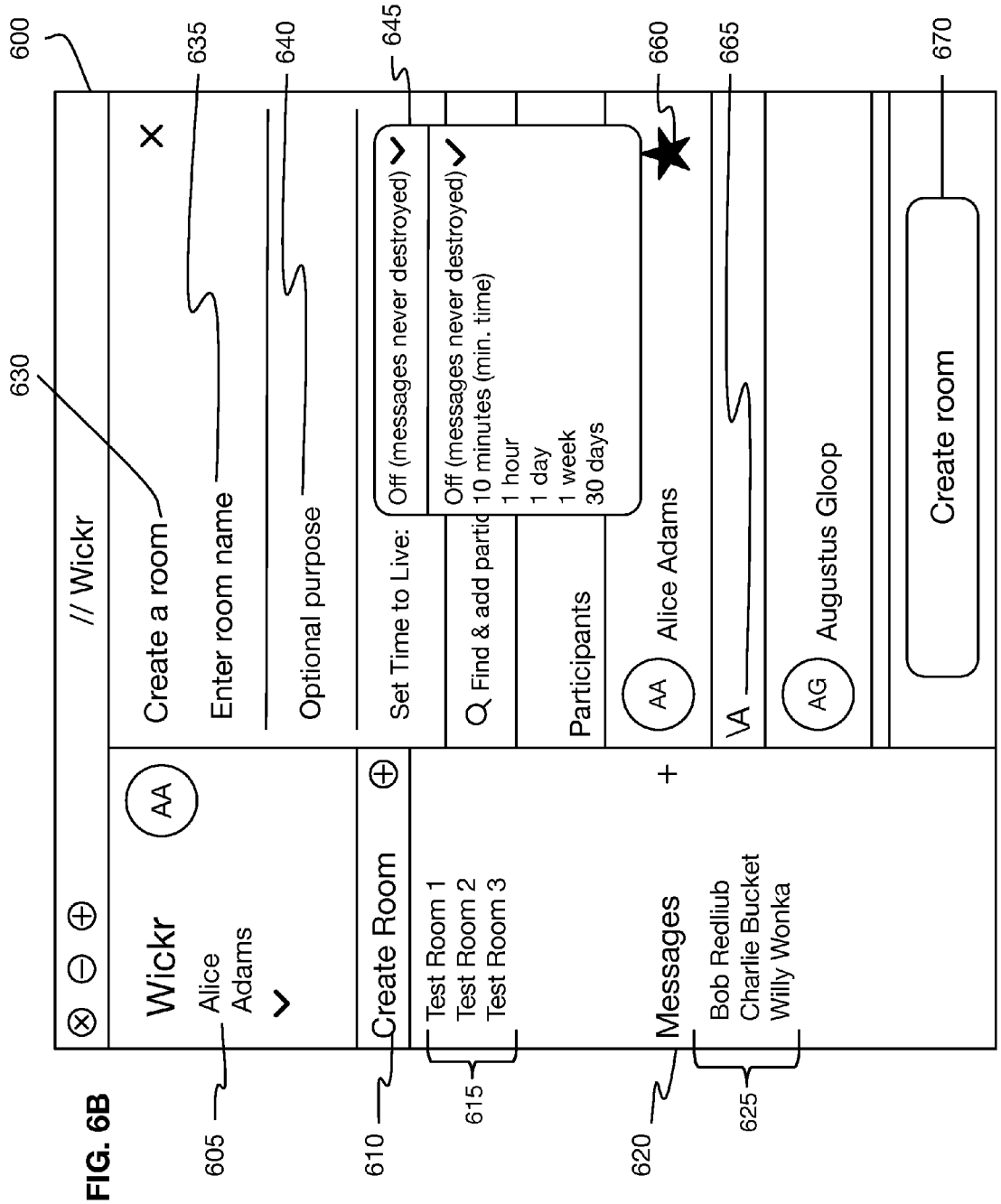

FIGS. 6A and 6B illustrate an exemplary interface for creating a secure room. In particular, FIGS. 6A and 6B show an interface 600 for the app 224. Interface 600 displays user information in field 605. The user information may include the user's name, their username, and an avatar that may be displayed to other users. The avatar may be the user's initials, the initials of their username, a photo, or an image that the user selected. As illustrated in FIGS. 6A and 6B, the user information for interface 600 belongs to "Alice Adams." In field 610, the user's secure rooms may be displayed. When field 610 is selected, the rooms field may change to a create room option. Field 615 may display the secure rooms that the user is a participant in. For example, interface 600 shows that Alice Adams is a member of three secure chat rooms: Test Room 1, Test Room 2, and Test Room 3. Field 620 shows the user's messages. In particular, field 625 may list all the one-to-one communication sessions that the user has open. In the example illustrated in FIGS. 6A and 6B, Alice Adams is involved in secure communications sessions with three users: Bob Redliub, Charlie Bucket, and Willy Wonka.

When the user wishes to create a new secure chat room, a "Create a Room" window 630 is displayed. The "Create a Room" window 630 includes a plurality of fields for the user, Alice Adams, to set preferences for the secure chat room. For example, field 635 may be a "Title Field" where the user may enter a title for the secure chat room. Field 640 may be a "Purpose Field" so that a user may enter a brief description of the room. According to some embodiments, the "Purpose Field" 640 may be optional. Additionally, the window 630 may include a "TTL Field" 645 that allows the room administrator to set a TTL for the communications of the secure chat room. FIG. 6B illustrates field 645 as a drop down menu displaying a plurality of options for the length with which communications will be available to room participants. While the TTL is displayed as a drop down menu, additional interfaces, such as radio buttons or a sliding bar, may be used to define the TTL value for the secure chat room. Additionally, the TTL may set to a plurality of values. For example, the TTL may be turned off or set to either 10 minutes, 1 hour, 1 day, 1 week, or 30 days. In this regard, the TTL may be configured based on user needs.

Field 650 is a search field to allow the user to add participants to the secure chat room. According to preferred embodiments, field 650 may allow users to search for participants based on username, phone number, email address, or other unique identifying information. Field 655 may list the participants of the secure chat room. The participants may be listed alphabetically. Alternatively, room administrators may be listed first with chat room participants listed thereafter in alphabetical order. Icon 660 may be used to distinguish room administrators from other participants. In this regard, icon 660 may appear next to all users who have been delegated room administrator privileges. Field 665 may be a directory listing all users in alphabetical order. In this regard, users may use field 665 to select participants for the secure chat room. Once the user has set all the chat room preferences and selected the chat room participants, the user may select button 670 to create the secure chat room. In response to selecting button 670, the "Create a Secure Room" message will be sent to all chat room participants.

Figure 7:
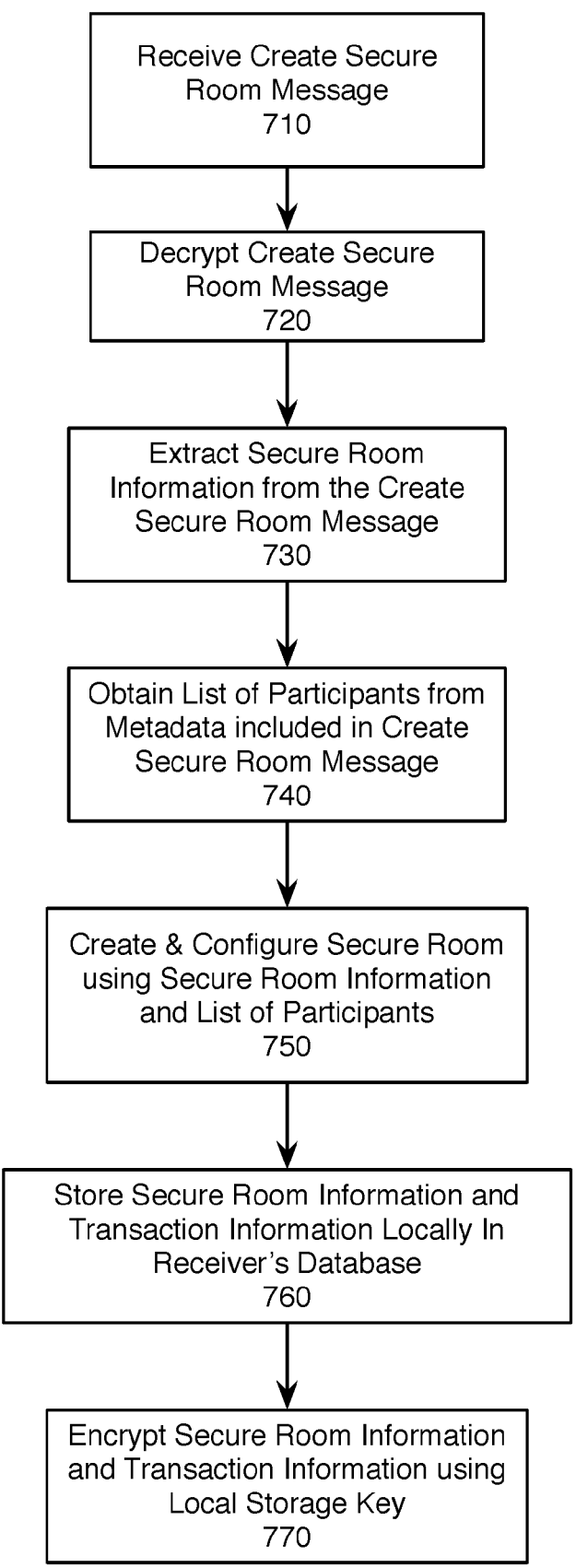
FIG. 7 illustrates a process for receiving an invitation to a secure chat room.

In response to receiving the "Create a Secure Room" message, a receiver's app may create a secure room based on the information contained therein. FIG. 7 illustrates an exemplary process for receiving an invitation to a secure chat room. In block 710, the participant receives the "Create Secure Room" message from the room creator. As noted above, receiving the "Create Secure Room" message may be in response to the participant receiving an alert, such as a push notification, from the security platform. In response to receiving the alert, the participant's app may connect to the security platform and download the "Create Secure Room" message. Alternatively, the receiver's app may receive the "Create Secure Room" message directly from the sender via a peer-to-peer communication. In block 720, the receiver's app decrypts the received "Create Secure Room" message using the techniques described above with respect to FIG. 4.

Once the "Create Secure Room" message is decrypted, the receiver's app extracts the secure room information from the "Create Secure Room" message in block 730. Next, in block 740, the receiver's app obtains a list of participants from the metadata included in "Create Secure Room" message. As noted above, the list of participants may include hashed usernames for the participants of the secure chat room. Accordingly, the receiver's app may compare the hashed username to usernames stored in the directory to display the participant's actual name. If the hashed username does not appear in the directory, the receiver's app may just display the username or other identifying information until the app is able to resolve the user's name to the username.

In block 750, the receiver's app creates the secure chat room. In particular, the receiver's app may use the secure room information and list of participants received in the "Create Secure Room" message to create and configure the secure chat room. Configuring the secure chat room may include displaying the title at the top of the chat room, displaying a room description below the room's title, and setting the TTL for the chat room. This information may be displayed in the secure chat room or available through a series of menu options.

After creating the secure chat room, the receiver's app may store the secure room information locally in the receiver's database in block 760. In preferred embodiments, the receiver's app creates a block chain for the secure chat room. As noted above, the block chain may index each transaction for the secure chat room, with the first entry in the block chain being the "Create Secure Room" message. In some embodiments, the block chain may be verified by other participants of the secure chat room before being stored in the receiver's database. That is, participants may corroborate each block chain entry within a predetermined time frame. After it is stored locally in the receiver's database, the secure room information may be encrypted using the receiver app's local storage key, in block 770. Additionally, metadata associated with the secure chat room may also be encrypted with the local storage key.

Figure 8:
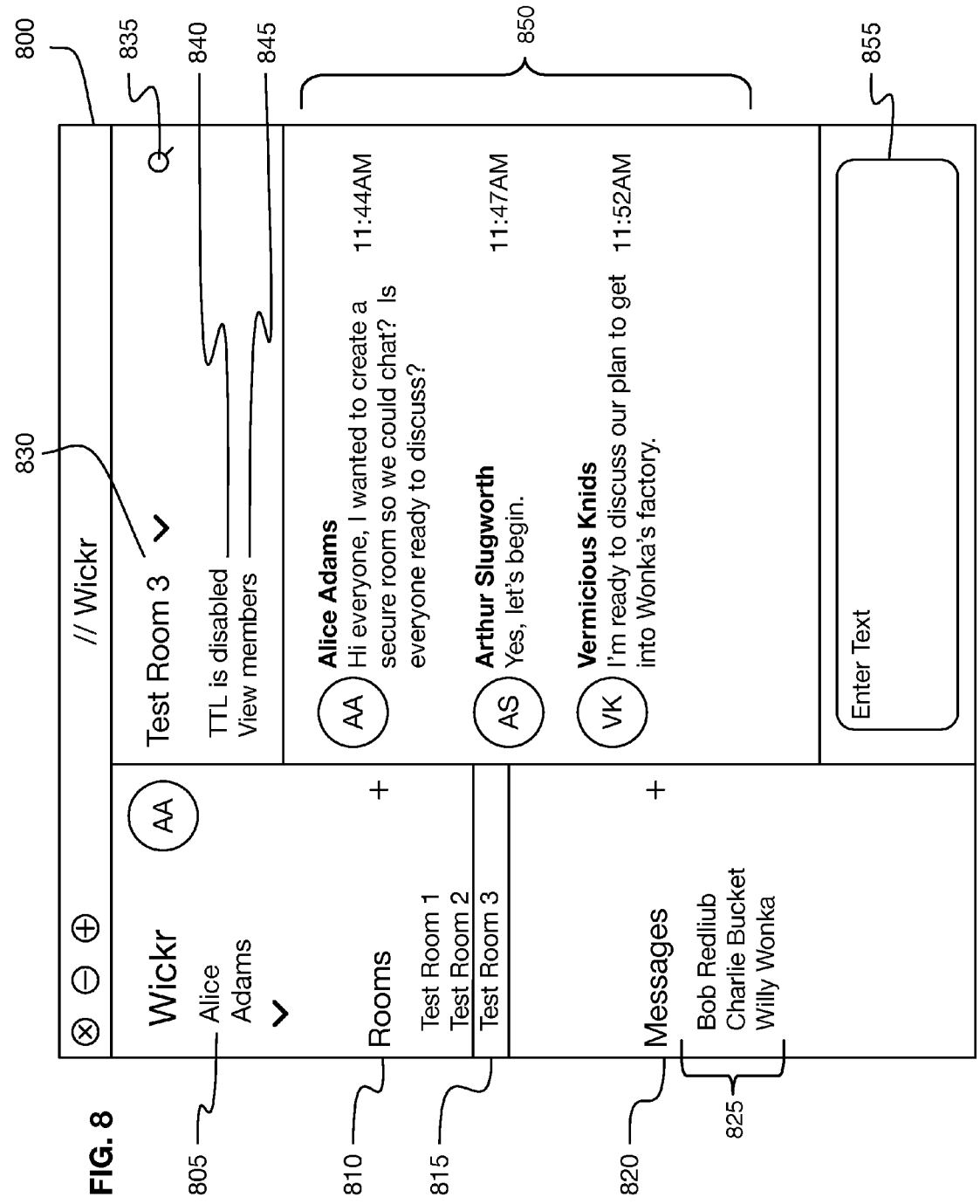
FIG. 8 illustrates a secure chat room interface according to another embodiment.

After creating the secure chat room, participants may send and receive messages to the secure chat room using the techniques described above. For example, sending a message to a secure chat room may be similar to the techniques described above with respect to FIG. 3 with the addition of a group identifier being added to the message. Similarly, a receiving app may decrypt messages and use the group identifier to associate the received message with the secure chat room associated with the group identifier. FIG. 8 illustrates an example of a secure chat room 800. Similar to FIGS. 6A and 6B above, secure chat room 800 displays user information in field 805. Field 810 displays the user's secure chat rooms, and field 815 illustrates that "Test Room 3" is selected. Accordingly, when different secure chat rooms are selected, different rooms may be highlighted. Similarly, field 820 shows the user's messages, while field 825 lists the user's individual communications. Continuing the example above, secure chat room 800 shows that Alice Adams is the user, and she belongs to three secure chat rooms and is participating in three one-to-one communication sessions. Furthermore, FIG. 8 shows that Test Room 3 is selected.

Test Room 3 is displayed is displayed in secure chat room 800. In particular, secure chat room 800 includes the room title in field 830, a search field 835, the TTL status in field 840, and the participants of secure chat room in field 845. Search field 835 provides users with the ability to do a text search for communications made in the secure chat room. Further, selecting field 845 may change the display to list all the participants in the secure chat room. The text of the secure chat room is displayed in 850. Further, a text box 855 is provided so that the user, Alice Adams, may enter messages and submit them to the secure chat room.

Figure 9A:
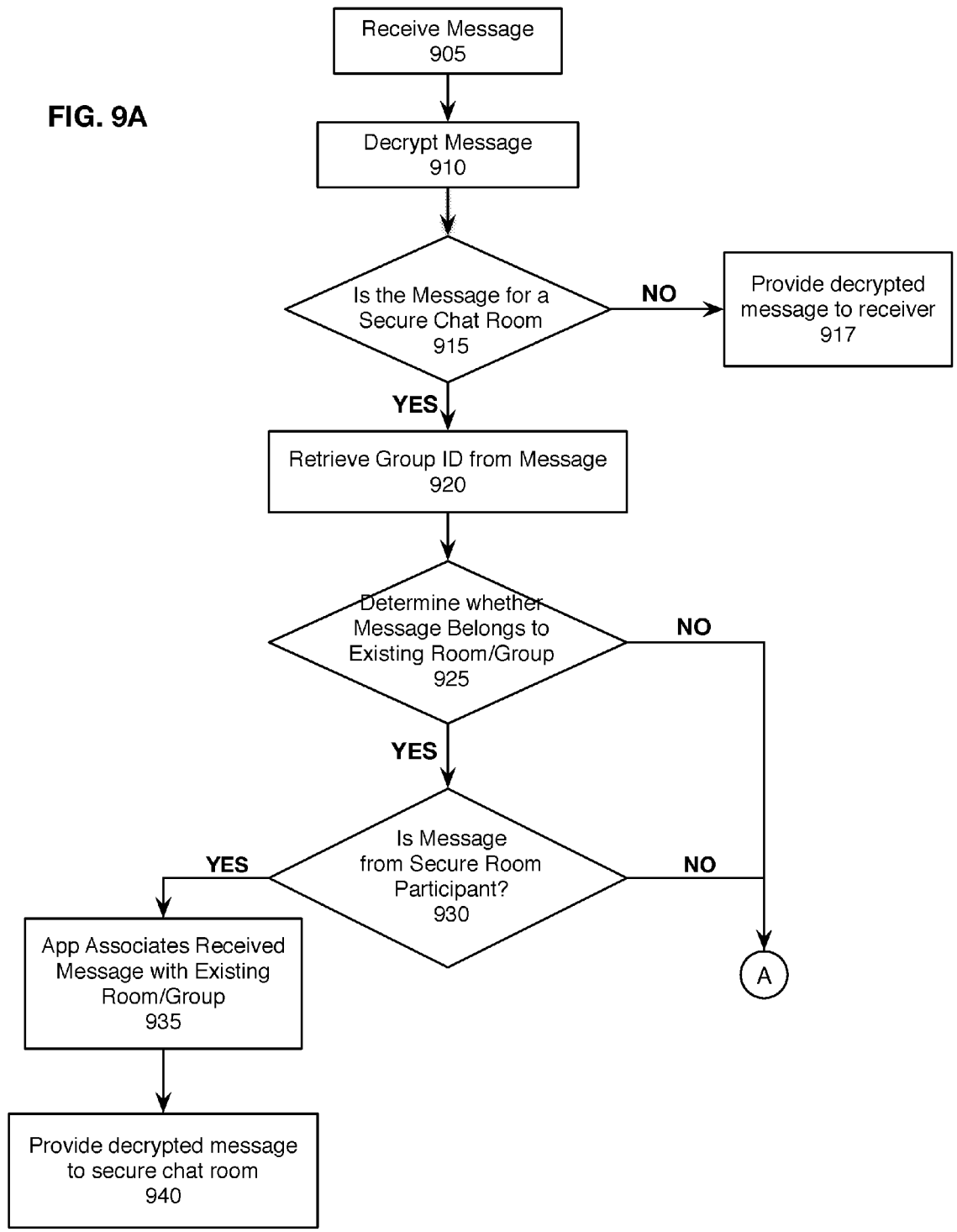
FIGS. 9A and 9B illustrate a process for handling received messages for a secure chat room.
Figure 9B:
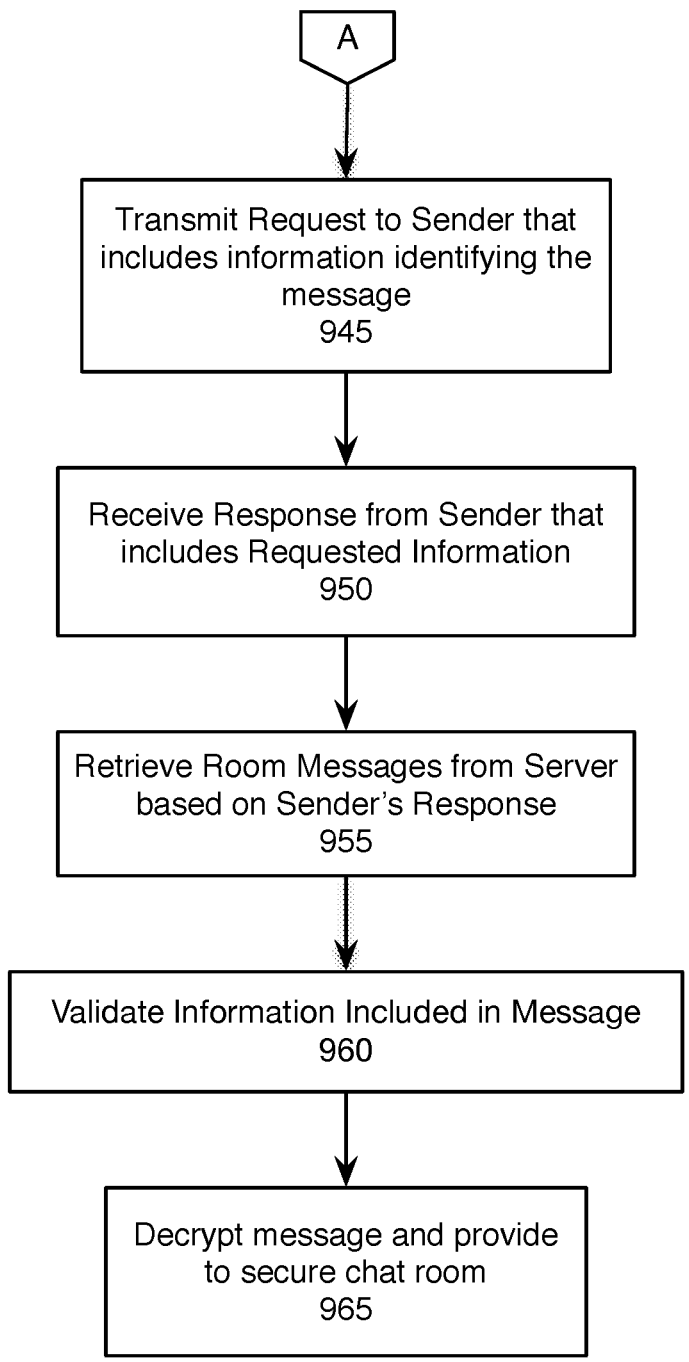

The techniques described above discuss creating and configuring a secure chat room, as well as sending encrypted communications to the secure chat room. In this regard, the app needs to be able to distinguish one-to-one communications from those that belong to secure chat rooms and deliver those messages that belong to secure chat rooms to the appropriate secure chat room. FIGS. 9A and 9B illustrate an exemplary process for handling received messages.

In block 905, the receiver's app receives a message. As noted above, this may include downloading the message from the security platform in response to receiving an alert, or, alternatively, receiving the message directly from the sender. In block 910, the receiver's app decrypts the message using the techniques described above with respect to FIG. 4.

In block 915, the receiver's app determines whether the received message is for a secure chat room or whether it is a one-to-one communication between the receiver and another user. For example, the receiver's app may determine from the message type field whether the message is intended for a secure chat room. In other examples, the receiver's app may determine if a group identifier is included in the message. If a group identifier is included in the message, then the receiver's app may determine that the message is a chat room message. If the received message is not for a secure chat room, then the receiver's app provides the decrypted message as a one-to-one communication in block 917.

If the message is destined for a secure chat room, then the receiver's app determines whether the received message belongs to an existing room or group in block 925. In this regard, the receiver's app may compare the received group identifier to group identifiers maintained in the device's local database to determine which group, if any, the message belongs to. If the receiver's app determines that the message does not belong to an existing room or group in block 925, the process proceeds to block 945 where the receiver's app may send a request to the sender's app for additional information. The request for additional information may include identifying information for the sender's reference, such as the group identifier and message identifier.

If the group identifier belongs to an existing secure chat room, the process proceeds to block 930, where the receiver's app determines whether the message is from a participant of the secure chat room. For example, the receiver's app may compare the sender of the message to the participant list stored on the receiver's device. If the sender does not appear on the sender's list, then the process proceeds to block 945, where the receiver's app transmits a request for additional information to the sender.

When the receiver's app determines that the message is from a secure chat room participant, the process proceeds to block 935 where the received message is associated with the existing room and/or group. Accordingly, the decrypted message is provided to the secure chat room in block 940. Providing the decrypted message may include displaying the text of the message or rendering content that was provided in the message. Further, the message may be recorded in the local database on the participant's device. In preferred embodiments, the communications is recorded as a transaction in a block chain stored in the participant's device, as discussed above.

When the participant's app makes a request to the sender's app for failing to recognize the received message, the sender may respond with the information requested by the receiver in block 950. This response may include transaction history for the secure chat room, as well as details for how the participant's app may retrieve the message. That is, the sender's app may retrieve metadata, the message identifier, and the message encryption key from their local database and provide it participant via an encrypted communication. In some embodiments, the sender's app may provide metadata and message identifier(s) for all of the control messages for the secure chat room to the participant's app such that the participant's app may determine the state of the secure chat room. Alternatively, the sender's app may provide metadata and message identifier(s) for both control messages and standard communications to allow the participant's app to determine the state of the secure chat room and update communications, if necessary.

In block 955, the receiver's app may retrieve the message(s) using the details contained in the sender's response. According to preferred embodiments, the receiver's app may provide the information received from the sender to the security platform. For example, the receiver's app may provide the metadata and message identifier(s) to the security platform. The security platform may then provide the receiver with the message(s) that correspond to the information received from the sender. In block 960, the receiver's app validates the information contained in the messages obtained from the security platform to obtain the state of the secure chat room. For example, the receiver's app may validate the sender, the message identifier, and the message key. As noted above, the sender may provide the receiver with the message encryption key to decrypt the message. In these embodiments, the receiver's app would not have to perform the steps required to decrypt the message encryption key since the receiver app is already in possession of the key needed to decrypt the message. Accordingly, the message is decrypted using the message key received from the sender and provided to the secure chat room in block 965.

Figure 10:
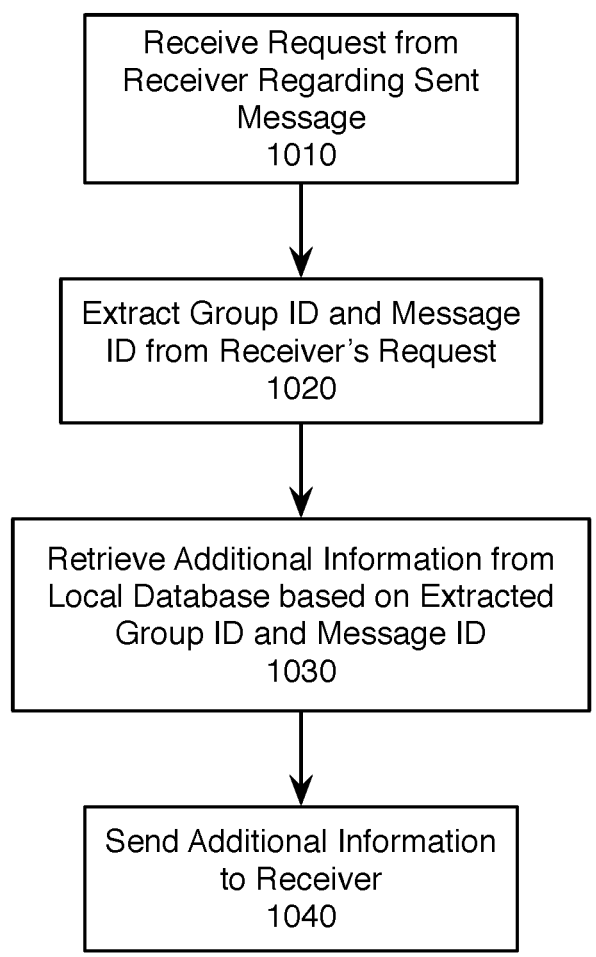
FIG. 10 illustrates a process for responding to a receiver's request for additional information.

Turning to FIG. 10, an exemplary process for responding to a receiver's request for additional information is shown. In block 1010, the sender would receive the request from a receiver regarding a sent message. As noted above, the request may include the group identifier and the message identifier. Accordingly, the sender's app extracts the group identifier and the message identifier from the receiver's request in block 1020. In block 1030, the sender's app retrieves the additional information requested from the receiver from his or her local database based on the extracted information. The information retrieved by the sender's app provides details such that the receiver's app may obtain the referenced message(s) from the security platform. In this regard, the information may include metadata, the message identifier, and the message encryption key. Alternatively, the sender's app may provide information to the receiver's app to obtain updated state information of the secure chat room. Once the information is retrieved by the sender's app, it is provided to the receiver, via an encrypted message, in block 1040.

Figure 11:
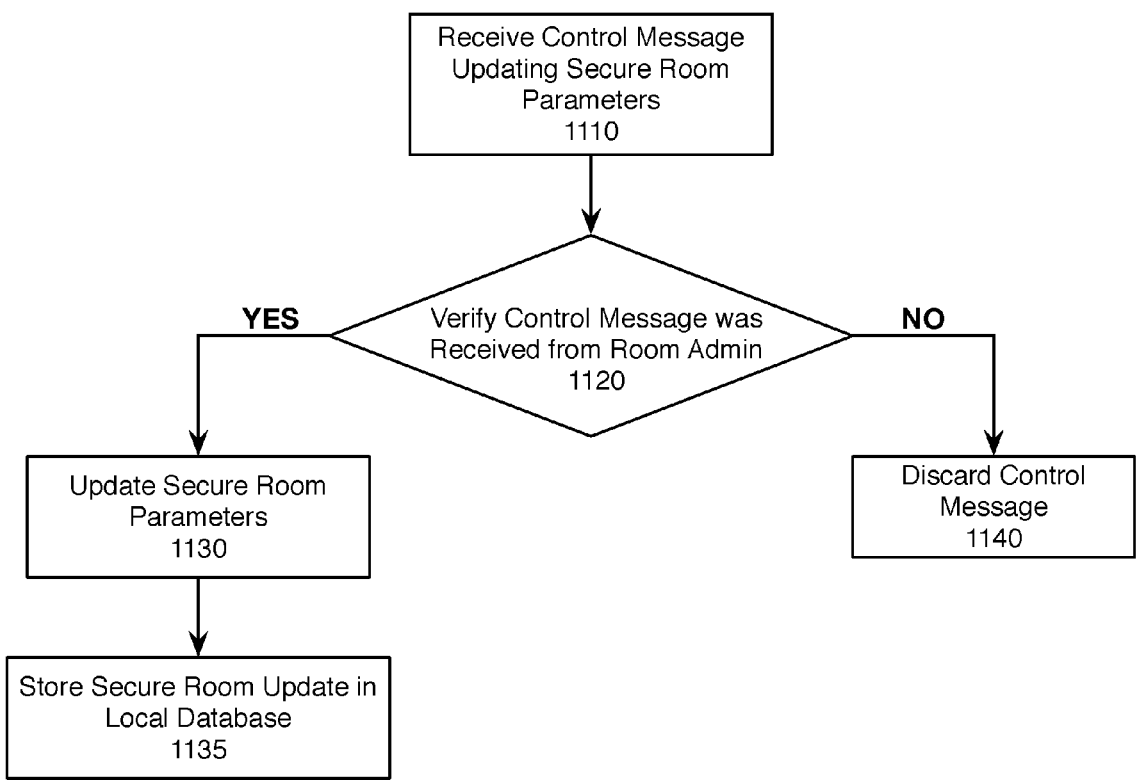
FIG. 11 illustrates a process for making changes to a secure chat room.

Periodically, the settings and preferences of the secure chat room may need to be updated. For example, the TTL may change or participants may be added or removed from the secure chat room. FIG. 11 illustrates an exemplary process for making changes to a secure chat room.

In block 1110, a receiver app receives a control message updating at least one secure room parameter. The secure room parameters may include updating the TTL or the participant list. In block 1120, the receiver app verifies that the control message was sent by a room administrator. This verification may include comparing the sender to the participant list maintained on the receiver's device. If the sender is not a room administrator, then the control message is discarded in block 1140. However, if the control message originated from a room administrator, the process proceeds to block 1130 where the secure room parameters are updated on the receiver's device. For example, the TTL of the messages in the secure chat room may change. In another example, the participant list may be updated. That is, participants may be added or removed from the secure chat room. According to preferred embodiments, the secure chat room may display a message in the chat room reflecting the updated room parameters. For instance, the secure chat room may display that the TTL has changed from one value to another or that certain participants have been added to or removed from the room.

Figure 12:
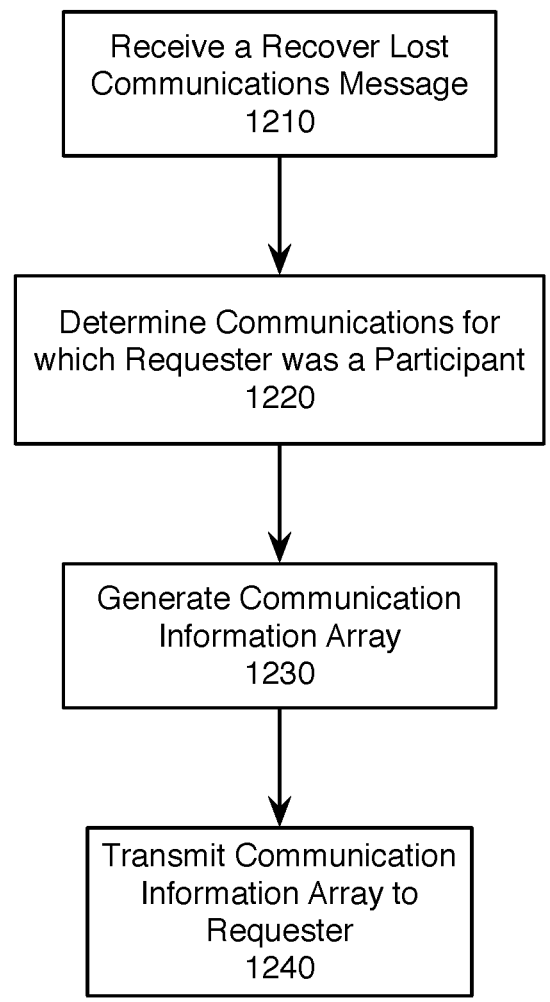
FIG. 12 shows a process for restoring chat room messages to participants' devices.

Additionally, participants of secure chat rooms may need to catch-up on missed communications, especially in response to the conditions discussed above. Alternatively, users may update their device periodically, or get a new device if their old device were lost or stolen. Accordingly, participants need a way to catch-up or recover and restore chat room messages to their new devices. FIG. 12 shows an exemplary process for restoring chat room messages to participants' devices.

In block 1210, a "Recover Lost Communications" message is received from a requester. According to some embodiments, the recovery message is transmitted in response to being unable to recognize a message. As discussed above, a message may be received from a user that does not appear on a participant list or the receiver's app may be unable to resolve the group identifier. Alternatively, a recovery message may be transmitted when the requester received a message for a secure chat room. In this regard, the requester sends the recovery message to the sender of the received message. Alternatively, the requester may be an administrator of the security platform.

In block 1220, the sender's app determines which communications the requester was a participant. In preferred embodiments, determining whether the requester was a participant in the secure chat room may include going through the block chain stored locally in the sender's local database to determine when the requester was a participant in the secure chat room. In embodiments where the requester is an administrator, all communications of the secure chat room may be provided to the requesting device.

In block 1230, a communication information array is generated including information identifying the messages that are to be provided to the requester. As noted above, this may include messages that the requester was a participant for or the entirety of the secure chat room history. The communication information array includes at least the message identifier(s), the group identifier, and the message encryption key(s) for each message being provided to the requester. According to some embodiments, the communication information array does not include control messages because the requester knows state of room from the most recent communication.

In block 1240, the communication information array is transmitted to the requester. Accordingly, the requester may use the information in the communication information array to obtain the messages from the security platform. Further, the requester may use the message encryption keys provided in the communication information array to decrypt the messages. In this regard, the requester may be able to recover and restore secure communications transmitted to the secure chat room.

Although the foregoing embodiments have been described in some detail for purposes of clarity of understanding, the present disclosure is not limited to the details provided. There are many alternative ways of implementing the present disclosure. The disclosed embodiments are illustrative and not restrictive.

What is claimed is:

1. A method for recovering communications, the method comprising:
   receiving, at a first device, a recovery message from a second device;
   determining, by the first device, one or more communications for which the second device was a participant in a secure group chat;
   generating, by the first device, a communication information array that includes the one or more communications for which the second device was a participant in the secure group chat;
   transmitting, by the first device, the communication information array to the second device.

2. The method of claim 1, further comprising:
   reviewing, by the first device, one or more communications stored in a secure memory to determine the one or more communications for which the second device participated in the secure group chat.

3. The method of claim 2, wherein the one or more communications are stored in a block chain.

4. The method of claim 1, wherein the communication information array includes at least one of a communication identifier, a group identifier, and a communication encryption key.

5. The method of claim 1, wherein the first device and second device are participants in the secure group chat.

6. The method of claim 1, wherein the first device is a mobile device.

7. A system for recovering communications, the system comprising:
   a processor configured to:
      receive a recovery message from a first device;
      determine one or more communications for which the first device was a participant in a secure group chat;
      generate a communication information array that includes the one or more communications for which the first device was a participant in the secure group chat;
      transmit the communication information array to the first device; and
   a memory coupled to the processor and configured to provide the processor with data and instructions.

8. The system of claim 7, wherein the processor is further configured to:
   review one or more communications stored in a secure memory to determine the one or more communications for which the first device participated in the secure group chat.

9. The system of claim 8, wherein the one or more communications are stored in a block chain.

10. The system of claim 7, wherein the communication information array includes at least one of a communication identifier, a group identifier, and a communication encryption key.

11. A non-transitory computer-readable medium comprising instructions that when, executed by at least one processor, perform the steps of:
   receiving a recovery message from a first device;
   determining one or more communications for which the first device was a participant in a secure group chat;
   generating a communication information array that includes the one or more communications for which the first device was a participant in the secure group chat;
   transmitting the communication information array to the first device.

12. The non-transitory computer-readable medium of claim 11, further comprising instructions for:
   reviewing one or more communications stored in a secure memory to determine the one or more communications for which the first device participated in the secure group chat.

13. The non-transitory computer-readable medium of claim 12, wherein the one or more communications are stored in a block chain.

14. The non-transitory computer-readable medium of claim 11, wherein the communication information array includes at least one of a communication identifier, a group identifier, and a communication encryption key.

* * * * *